(12) United States Patent
Kim et al.

(10) Patent No.: US 8,522,359 B2
(45) Date of Patent: Aug. 27, 2013

(54) APPARATUS AND METHOD FOR AUTOMATIC UPDATE

(75) Inventors: Young-suk Kim, Suwon-si (KR); Jong-suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1454 days.

(21) Appl. No.: 11/582,420

(22) Filed: Oct. 18, 2006

(65) Prior Publication Data

US 2007/0101417 A1 May 3, 2007

(30) Foreign Application Priority Data

Oct. 27, 2005 (KR) .................. 10-2005-0101966

(51) Int. Cl.
*G06F 7/04* (2006.01)
(52) U.S. Cl.
USPC .............. 726/30; 726/22; 713/152; 713/160; 713/193

(58) Field of Classification Search
None
See application file for complete search history.

(56) References Cited

U.S. PATENT DOCUMENTS

| 2003/0147369 A1* | 8/2003 | Singh et al. ............ 370/338 |
| 2005/0091501 A1* | 4/2005 | Osthoff et al. ............ 713/181 |
| 2006/0190724 A1* | 8/2006 | Adams et al. ............ 713/166 |

FOREIGN PATENT DOCUMENTS

| JP | 2005-063207 A | 3/2005 |
| KR | 10-2003-0015198 A | 2/2003 |
| KR | 10-2003-0052510 A | 6/2003 |
| KR | 10-2004-0089112 A | 10/2004 |

\* cited by examiner

*Primary Examiner* — Shewaye Gelagay
(74) *Attorney, Agent, or Firm* — Sughrue Mion, PLLC

(57) ABSTRACT

An apparatus and method for automatic update are provided. The method includes storing authentication information for data, including first and second data, receiving the first data from the device, performing an authentication of the first data using the authentication information, and determining whether to receive the data, including the first data and the second data, according to the authentication.

20 Claims, 5 Drawing Sheets

APPARATUS AND METHOD FOR AUTOMATIC UPDATE

CROSS-REFERENCE TO RELATED PATENT APPLICATIONS

This application is based on and claims priority from Korean Patent Application No. 10-2005-0101966 filed on Oct. 27, 2005 in the Korean Intellectual Property Office, the disclosure of which is incorporated herein in its entirety by reference.

BACKGROUND OF THE INVENTION

1. Field of the Invention

Apparatuses and methods consistent with the present invention relate to an automatic update and, more particularly, to an automatic update, which enables a client to perform an update using data received from a server connected to a user's computer via a network.

2. Description of the Related Art

In general, if an update is performed by receiving data via a network, the data has to be authenticated after all data is received. For example, a client requests data from a server connected via a network, and the server transmits the data at the client's request.

The authentication of the received data refers to testing the integrity of the received data. If the authentication is not performed, normal operation is not performed at a client. The client has to secure storage space for the data, in order to receive the data and perform the authentication of the received data.

However, if there is insufficient storage space in the client, the client receives the data and performs an update at the same time. In this case, the client cannot perform a normal authentication of the data due to insufficient storage space, and the integrity of the received data cannot be tested, and therefore an abnormal update may be performed. Accordingly, a method of performing an authentication of data even when the storage space is not secured in the client is required.

Korean unexamined patent No. 2004-0089112 discloses a method and a system for receiving a payload message if header data is verified successfully by the mobile terminal by receiving a header message including the header data from the loading station and verifying the received header data, which allows a differential update of existing software or other payload and enables download to be limited to require patches; however, a method of performing a normal authentication when there is insufficient storage space in a client is not disclosed.

SUMMARY OF THE INVENTION

In view of the above, it is an exemplary object of the present invention to provide an automatic upgrade apparatus and a method for performing an authentication even when there is insufficient storage space for an update.

This and other objects, features and advantages, of the present invention will become clear to those skilled in the art upon review of the following description, attached drawings and appended claims.

According to an exemplary aspect of the present invention, there is provided an automatic update apparatus including an authentication information storage unit that stores authentication information for update data including first and second data to be received from a predetermined first device, a receiving unit that receives the first data from the first device, and a controller that performs an authentication for the first data and determines whether to receive the update data, including the first data and the second data, according to the authentication.

According to another exemplary aspect of the present invention, there is provided an automatic update system comprising a transmission unit that transmits first data to a predetermined device, and a controller that determines whether to transmit update data, including the first data and second data, based on a response to the transmitted first data.

According to a further exemplary aspect of the present invention, there is provided an automatic update method comprising receiving, from a first device, authentication information for update data including first data and second data; storing the authentication information; receiving the first data from the first device, performing an authentication of the first data, and determining whether to receive the update data, including the first data and the second data, according to the authentication.

According to another exemplary aspect of the present invention, there is provided an automatic update method comprising transmitting the first data from a first device to a second device; receiving, at the first device from the second device, a response according to the transmitted first data; and determining, at the first device, whether to transmit update data, including the first data and second data, based on the response.

BRIEF DESCRIPTION OF THE DRAWINGS

The above and other exemplary aspects and advantages of the present invention will become more apparent by describing in detail preferred embodiments thereof with reference to the attached drawings, in which.

DETAILED DESCRIPTION OF EXEMPLARY EMBODIMENTS OF THE INVENTION

Figure 1:
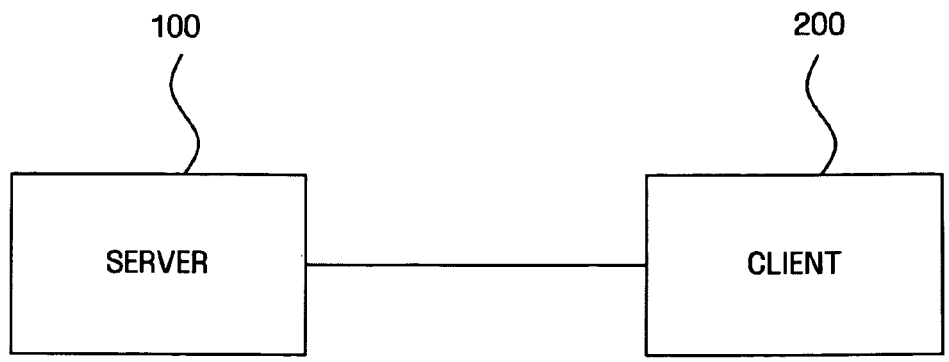
FIG. 1 depicts an automatic update apparatus according to an exemplary embodiment of the present invention.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to embodiments of the invention. It should be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute the instructions via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded into a computer or other programmable data processing apparatus to cause a series of operations to be performed in the computer or other programmable apparatus to produce a computer implemented process such that the instructions that execute in the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order or in a different order entirely, depending upon the functionality involved. Before the detailed description is set forth, terms used in this specification will be described briefly.

The description of terms is provided for a better understanding of the specification and terms that are not explicitly defined herein are not intended to limit the broad aspect of the invention.

FIG. 1 depicts an automatic update apparatus according to an exemplary embodiment of the present invention.

As illustrated in FIG. 1, an automatic update apparatus according to an exemplary embodiment of the present invention includes a server 100 that provides data for the update and a client 200 that performs the update using the provided data. Here, the data may be software; however, the data is not limited thereto.

Figure 2:
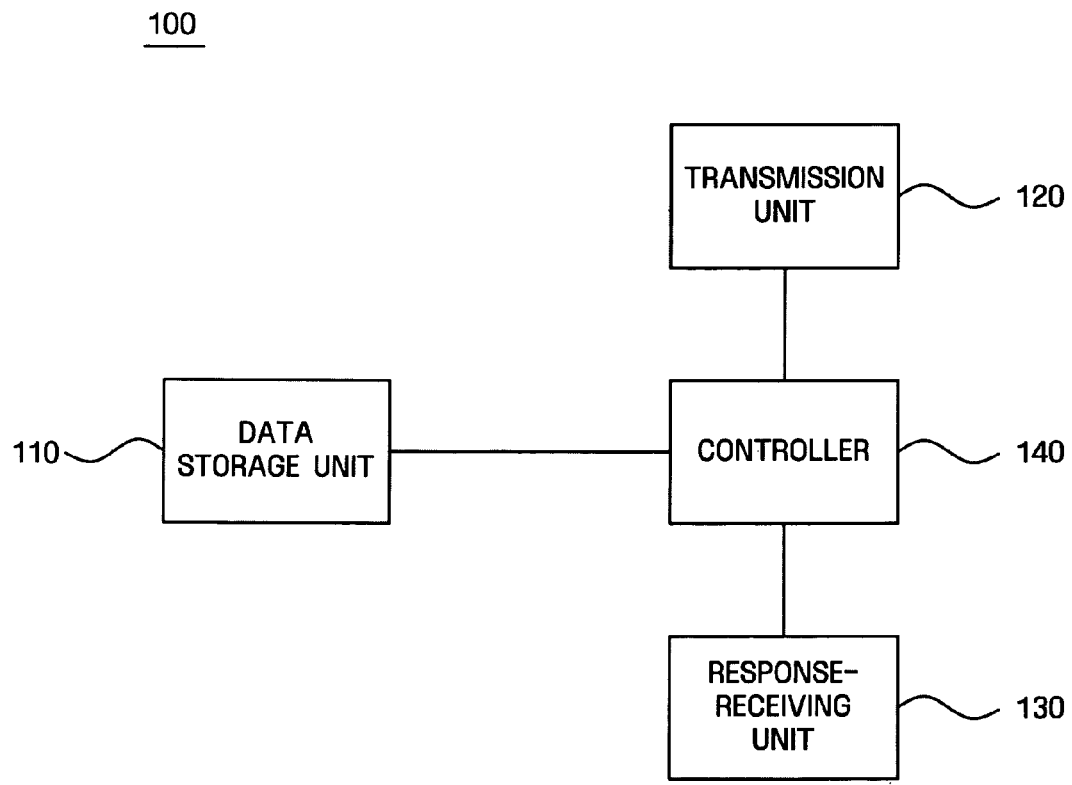
FIG. 2 depicts a server according to an exemplary embodiment of the present invention.

FIG. 2 depicts a server according to an exemplary embodiment of the present invention.

As illustrated in FIG. 2, the server 100 includes a data storage unit 110 that stores data that is divided into data corresponding to a first area (hereinafter, referred to as the "first data") and data corresponding to a second area (hereinafter, referred to as the "second data"), and is provided to the client 200, a transmission unit 120 that transmits the first data to the client 200, a response-receiving unit 130 that receives a response to the transmitted first data, and a controller 140 that determines whether to transmit the stored data according to the received response.

The first area and the second area refer to areas where data stored in the data storage unit 110 is divided by a predetermined size. A total size of the first and second data stored in the first and second areas is the size of the stored data in the data storage unit 110. In an exemplary embodiment of the present invention, a case in which the size of the first area is smaller than the size of the second area (i.e., the first data size is smaller than the second area size) will be described as an example.

Each size of the first and second size may be determined according to a storage size secured by the client 200 in order to receive data from the server 100. As a device for receiving and storing the provided data from the server 100, the memory of the client 200 may include a cache, ROM, PROM, EPROM, EEPROM, flash, SRAM or other devices; however, the memory is not limited thereto.

The size of the first data of the stored data in the data storage unit 110 may vary according to a storage size secured by the client 200. When the client 200 receives the data stored in the data storage unit 110, if the memory of the client 200 is insufficient to perform an authentication of the received data, the server 100 transmits only the first data stored in the data storage unit 110 to the client 200. Accordingly, the client 200 performs an authentication of the transmitted first data. If the authentication is successful, the client 200 requests all the data (both the first data and the second data) stored in the data storage unit 110. The authentication of the first data will be described in detail later.

The transmission unit 120 transmits only the first data, of the data stored in the data storage unit 110, to the client 200 when the client 200 requests data. The response-receiving unit 130 receives a response to the first data from the client 200. According to the authentication result of the first data transmitted to the client 200, the received response may include a request for the data stored in the data storage unit 110, or another request for the first data due to a failure to authenticate the first data.

The controller 140 may determine to transmit the data stored in the data storage unit 110, and re-transmit the first data upon the response received from the client 200.

Figure 3:
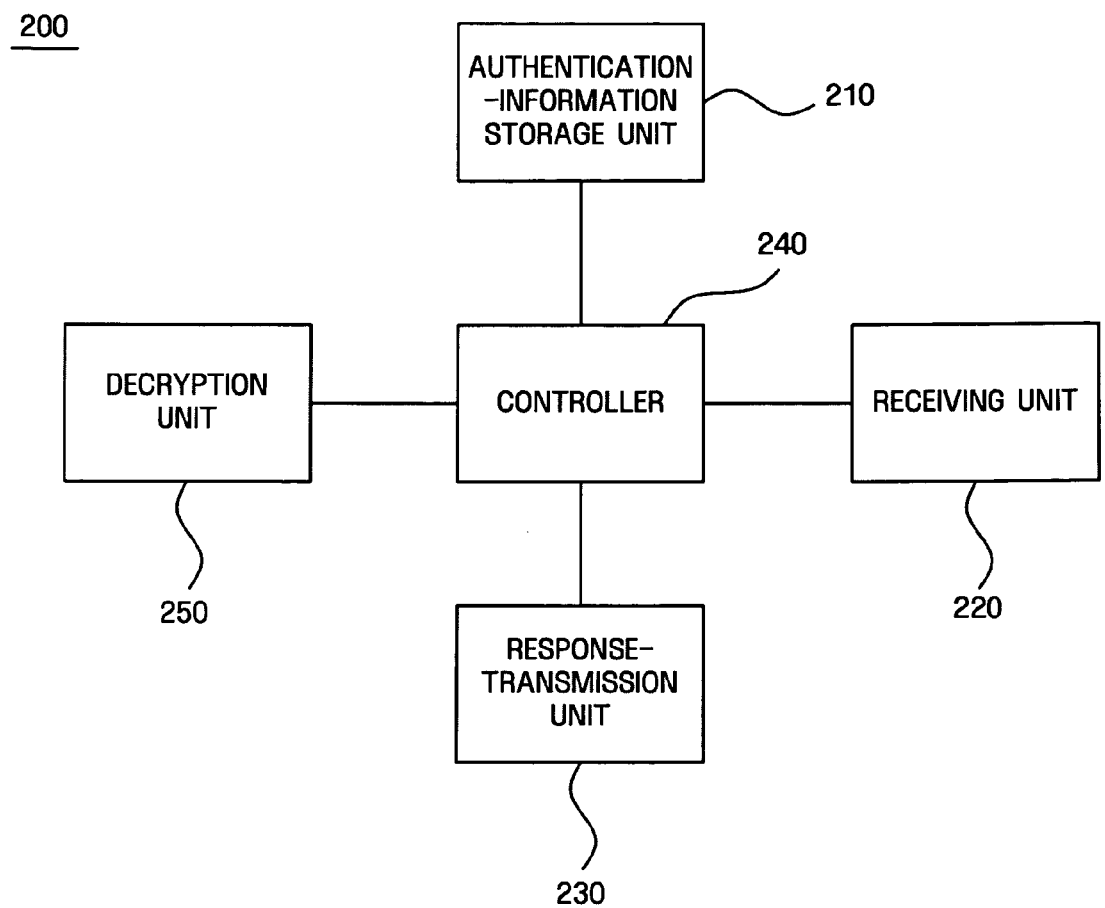
FIG. 3 depicts a client according to an exemplary embodiment of the present invention.

FIG. 3 depicts a client according to an exemplary embodiment of the present invention.

As illustrated in FIG. 3, the client 200 includes an authentication-information storage unit 210 that stores authentication information for authenticating the first data transmitted from the server 100, a receiving unit 220 that receives the first data transmitted from the server 100, a controller 240 that performs an authentication of the received first data by the authentication information stored in the authentication-information storage unit 210, and determines to receive data according to the authentication result, and a response transmission unit 230 that transmits a response on whether the determined data has been received.

The authentication information stored in the authentication-information storage unit 210 is provided from the server 100 prior to updating data in the client 200. The stored authentication information may be encrypted by the server 100. For example, the server 100 may provide the client 200 with authentication information on the data encrypted by electronic signatures. Accordingly, the server 100 provides the client 200 with the electronically signed authentication information and a public key for decrypting the authentication information. Accordingly, the client 200 can ensure the integrity of the authentication information through the electronically signed authentication information, and check that the server 100 has transmitted the first data. Here, the client 200 may include a decryption unit 250 for decrypting the encrypted authentication information. If authentication information is encrypted by electronic signatures, the decryption unit 250 decrypts the authentication information using the public key that was provided with the authentication information.

The controller 240 authenticates the received first data through the authentication information. In an exemplary embodiment of the present invention, a case is described where the controller 240 performs an authentication by determining whether a hash value stored in the authentication-information storage unit is the same as a received hash value corresponding to the first data.

Accordingly, the controller 240 extracts a hash value from the authentication information stored in the authentication-information storage unit, and calculates the received hash value corresponding to the first data. If the hash values are the same, the authentication is successful. If the authentication information is stored in an encrypted manner in the authentication-information storage unit 210, the controller 240 decrypts the encrypted authentication information via the decryption unit 250, extracts a hash value from the decrypted authentication information. For example, if the electronically signed authentication information is stored in the authentication information unit 210, the controller 240 decrypts the electronically signed authentication information using the provided public key, and then extracts a hash value from the decrypted authentication information.

The controller 240 transmits a response to the authentication result to the server 100 via the response-transmission unit 230. If the authentication is successful (i.e., the hash values are the same), the transmitted response requests the server 100 for all the data. If the authentication fails, the first data is requested again.

When all the data is received because the authentication is successful, the controller 240 may authenticate the received data after all the data is completely received. The received data may be authenticated by electronic signatures corresponding to all the data; however, the authentication method is not limited thereto. When the authentication fails, the controller 240 requests all the data again.

Figure 4:
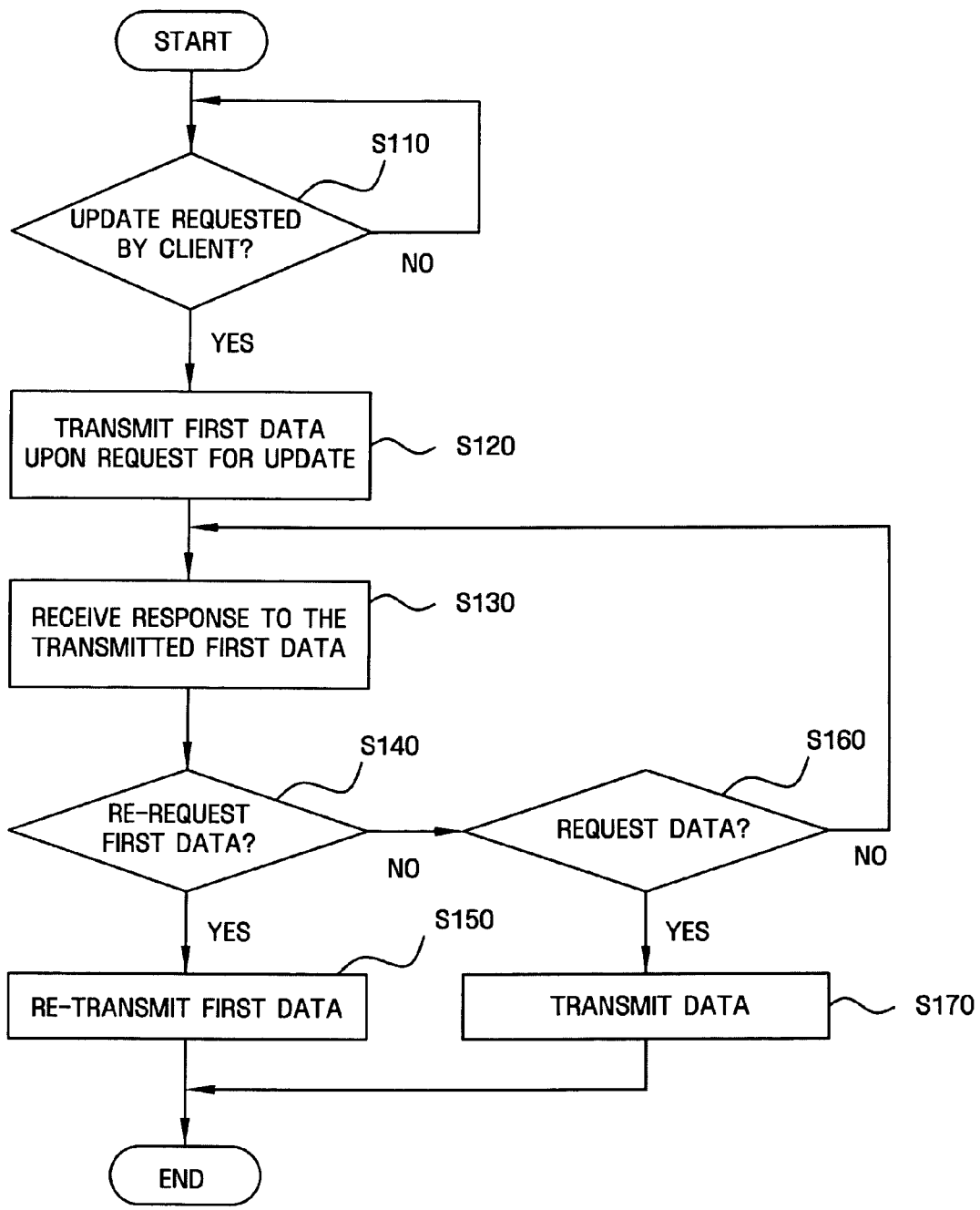
FIG. 4 illustrates a method of operating a server according to an exemplary embodiment of the present invention.

FIG. 4 illustrates a method of operating a server according to an exemplary embodiment of the present invention.

As illustrated in FIG. 4, when the client 200 requests the data (S110), the server 100 transmits the first data stored in the data storage unit 110 to the client 200 (S120).

The server 100 receives a response to the transmitted first data (S130). The received response may include a re-request for the first data due to a failure of the authentication of the transmitted first data or a request for data due to the success of the authentication of the transmitted first data.

If the received response requests the first data (S140) again, the server 100 re-transmits the first data to the client 200 (S 150). If the received response requests data because the authentication of the first data is successful (S 160), the server 100 transmits the data stored in the data storage unit 110 to the client 200 (S170).

Figure 5:
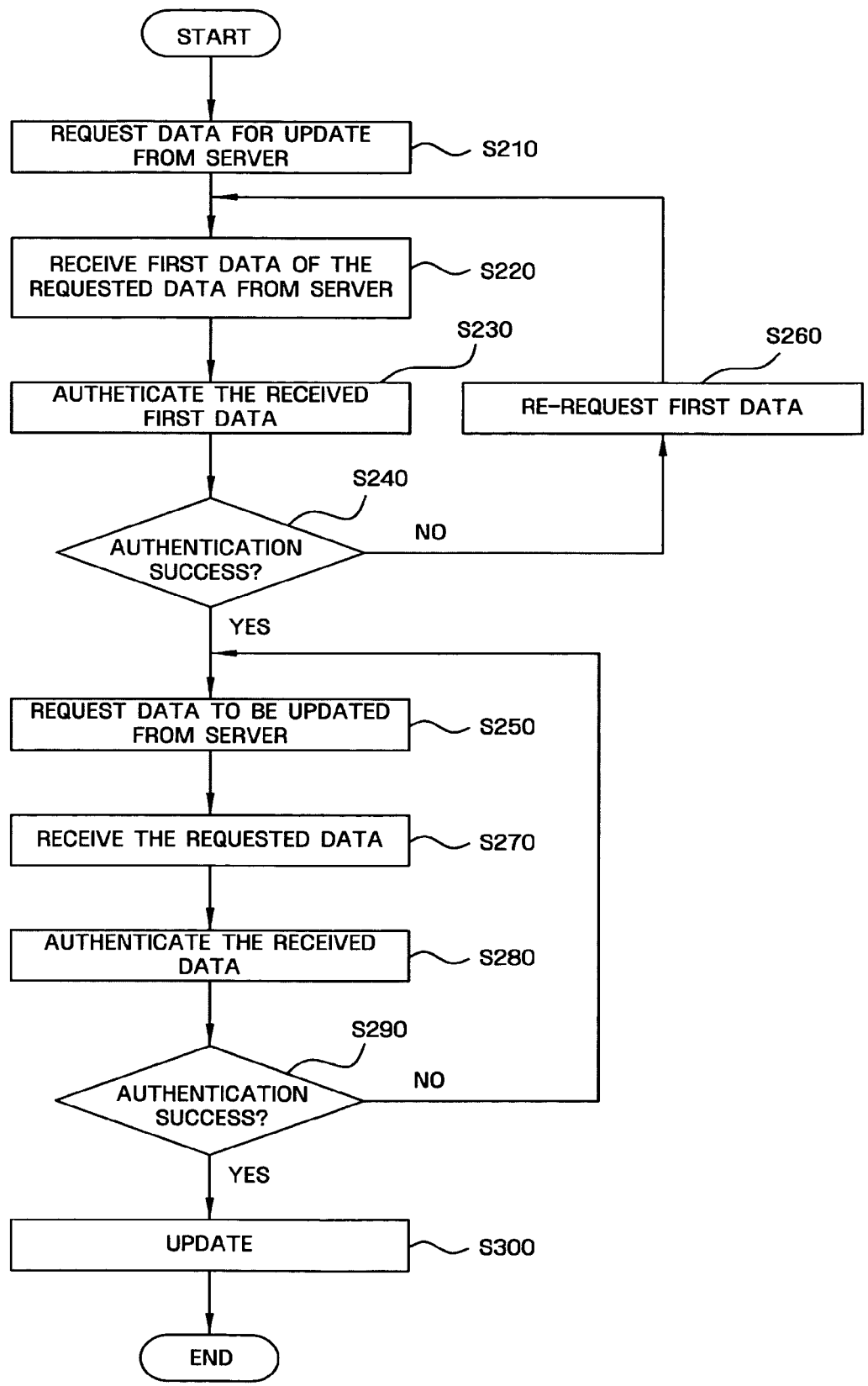
FIG. 5 illustrates a method of operating a client according to an exemplary embodiment of the present invention.

FIG. 5 illustrates a method of operating a client according to an exemplary embodiment of the present invention. Here, a case is described where the client 200 has already had authentication information received from the server 100, before requesting the data. The stored authentication information may be stored in encrypted from by electronic signatures.

As illustrated as FIG. 5, the client 200 requests data for the update from the server 100 (S210). The client 200 receives the first data of the data-to-be-updated from the server 100 (S220).

In detail, the data provided from the server 100 to the client 200 consists of first and second data. If the client 200 requests data for the update, the server 100 transmits only the first data. The client 200 receives all data for the update, and then authenticates the received data. However, if the client 200 receives all data for the update, the memory of the client 200 has to be sufficient for the received data and the time required for authentication increases. In the present invention, the client 200 receives only the first data of the data, performs the authentication, and then requests the data when the authentication is successful, thereby reducing the amount of memory the client 200 needs, and performing even when the amount of memory is insufficient.

The client 200 authenticates the received first data (S230). In detail, the controller 240 authenticates the received first data through the authentication information stored in the authentication information storage unit 210. If the authentication information is a hash value, the controller 240 compares a hash value extracted from the authentication-information storage unit and a hash value corresponding to the received first data. Then hash values are the same, the authentication is successful, but if they are different, the authentication fails. If the authentication information stored in the authentication is encrypted, the controller 240 decrypts the encrypted authentication information via the decryption unit 250, and then performs the authentication by comparing a hash value extracted from the decrypted authentication information and a hash value corresponding to the received first data.

If the authentication for the first data is successful (S240), the client 200 requests the server 100 for data (S250). If the authentication of the first data is not successful, the client 200 re-requests the server 100 for the first data (S260) from the server 100.

The client 200 requests the data from the server 100 if the authentication is successful, and receives the requested data (S270).

Then, the client 200 authenticates the received data (S280). If the authentication of the received data is successful (S290), the client 200 performs an update using the received data (S300). If the authentication of the received data is not successful, the client 200 requests for the data from the server 100 again.

Figure 6:
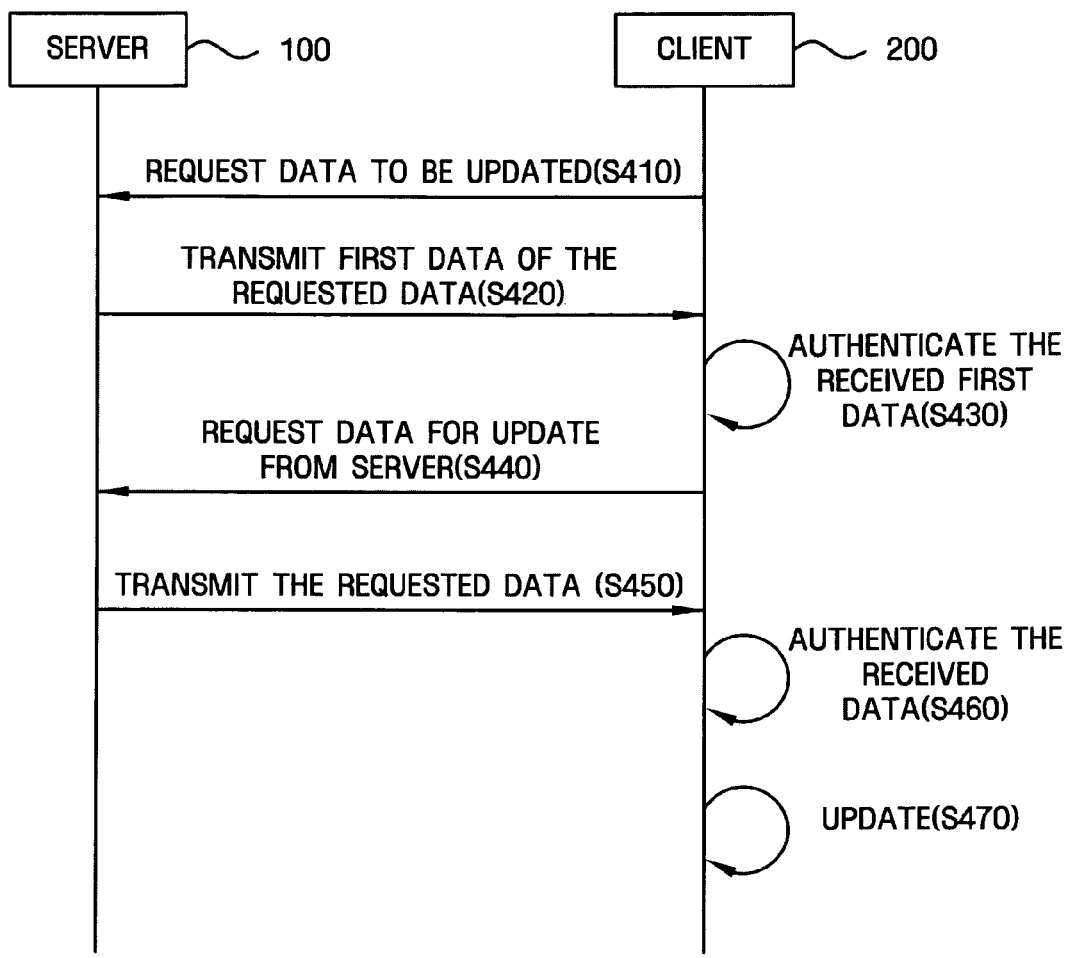
FIG. 6 illustrates an update operated between a server and a client according to an exemplary embodiment of the present invention.

FIG. 6 illustrates an automatic update operated between a server and a client according to an exemplary embodiment of the present invention.

As illustrated in FIG. 6, the client 200 requests the server 100 for the data (S410). The server 100 transmits the first data to the client 200 upon a request of the client 200 (S420).

The client 200 authenticates the received first data by the authentication stored in the authentication-information storage unit 210 (S430). If the authentication is successful, the client 200 requests the server 100 for the data (S440). If the authentication of the received first data is not successful, the client 200 requests the first data from the server 100 again.

The server 100 transmits the data to the client 200 upon a request of the client 200 (S450).

The client 200 authenticates the data transmitted from the server 100 (S460). If the authentication is successful, the client 200 performs an update using the transmitted data (S470). If the authentication of the received data is not successful, the client 200 requests the server 100 for the data from the server 100 again.

The term "module", as used herein, means, but is not limited to, a software or hardware component, such as a field programmable gate-array (FPGA) or an application-specific integrated circuit (ASIC), which performs certain tasks. A module may advantageously be configured to reside in the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

According to the present invention, an apparatus and a method for automatic update performs an authentication of data even when there is insufficient storage space for the update, which can perform a normal authentication by determining the integrity of the data.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic update apparatus comprising:
    an authentication-information storage unit that stores authentication information for update data including first data and second data received from a predetermined device, wherein the authentication information, as stored in the authentication-information storage unit, is encrypted;
    a data-receiving unit that receives the first data from the predetermined device; and
    a controller that authenticates the first data using the authentication information, and determines whether to receive the update data, including the first data and the second data, according to the authentication result;
    wherein a size of the first data varies according to a size of a storage, such that the size of the storage is sufficient to perform the authentication of the first data.

2. The apparatus of claim 1, wherein the authentication information comprises a hash value corresponding to the first data.

3. The apparatus of claim 2, wherein the controller calculates a hash value corresponding to the first data, and determines whether to receive the update data by comparing the calculated hash value to a hash value included in the authentication information.

4. The apparatus of claim 3, wherein the controller requests the update data from the predetermined device the calculated hash value is the same as the hash value included in the authentication information.

5. The apparatus of claim 1, wherein the update data received according to the authentication result is update data corresponding to stored data, and the controller updates the stored data using the update data.

6. The apparatus of claim 1, wherein the authentication information is received from the predetermined device and is encrypted by the predetermined device.

7. The apparatus of claim 6, further comprising a decryption unit that decrypts the encrypted authentication information.

8. An automatic update system comprising:
    a first device comprising;
        a transmission unit that transmits first data to a second device, in accordance with an instruction to transmit first data, and transmits update data, including the first data and second data, to a second device, in accordance with an instruction to transmit update data; and
        a controller that determines whether to transmit the update data, including the first data and the second data, by a response received relating to first data transmitted to the second device; and
    the second device, comprising:
        an authentication-information storage unit that stores authentication information for the first data, wherein the authentication information, as stored in the authentication-information storage unit is encrypted;
        wherein a size of the first data varies according to a size of a storage of the second device, such that the size of the storage is sufficient to perform the authentication of the first data using the storage.

9. The system of claim 8, wherein the second device further comprises a controller that compares a hash value included in the authentication information and a hash value corresponding to the transmitted first data, and then requests the update data, including the first and second data, from the first device if the hash values are the same.

10. The system of claim 9, wherein, if the second device requests the update data, the controller of the first device controls the transmission unit to transmit the update data to the second device.

11. The apparatus of claim 10, wherein, the data transmitted to the first device is the updated data that was stored in the first device, and the first device updates the stored data using the updated data.

12. The method of claim 11, wherein the data received according to the authentication result is the data updated corresponding to the stored data, and determining whether to receive the update data comprises updating the stored data using the updated data.

13. A method comprising:
    receiving, from a first device, encrypted authentication information for update data including first data and second data;
    storing the encrypted authentication information;
    receiving the first data from the first device;
    decrypting the authentication information;
    authenticating the first data using the authentication information; and
    determining whether to receive the update data, including the first data and the second data, according to the authentication result,
    wherein a size of the first data varies according to a size of a storage, such that the size of the storage is sufficient to perform the authentication of the first data.

14. The method of claim 13, wherein the authentication information comprises a hash value corresponding to the first data.

15. The method of claim 14, wherein the authenticating the first data comprises:
    calculating a hash value corresponding to the received first data; and
    comparing the calculated hash value to a hash value included in the authentication information.

16. The method of claim 15, wherein the determining whether to receive the data comprises requesting the data from the first device if the calculated hash value is the same as the hash value included in the authentication information.

17. A method comprising:
    storing, at a second device, encrypted authentication information;
    transmitting first data from a first device to the second device;
    decrypting the authentication information at the second device;

at the second device, authenticating the first data based on the authentication information;

receiving a response, according to the authentication, at the first device from the second device; and determining, at the first device, whether to transmit update data, including the first data and second data, based on the received response from the second device, wherein a size of the first data varies according to a size of a storage of the second device, such that the size of the storage is sufficient to perform the authentication of the first data using the storage.

18. The method of claim 17, wherein the authenticating the first data comprises:

at the second device, comparing a hash value included in the authentication information with a hash value corresponding to the transmitted first data, and transmitting a request for the update data, including the first data and the second data, if the hash values are the same.

19. The method of claim 18, further comprising, at the first device, receiving the request for the update data; and transmitting the update data, including the first data and the second data, to the second device.

20. The method of claim 19, wherein, the data transmitted to the first device is the updated data that was stored in the first device, and the first device updates the stored data using the updated data.

* * * * *